(12) United States Patent
Ono et al.

(10) Patent No.: US 9,376,009 B2
(45) Date of Patent: Jun. 28, 2016

(54) DRIVING DEVICE FOR HYBRID VEHICLE

(75) Inventors: Tomohito Ono, Susono (JP); Yuji Iwase, Mishima (JP); Takahito Endo, Susono (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 14/388,630

(22) PCT Filed: Mar. 28, 2012

(86) PCT No.: PCT/JP2012/058255
§ 371 (c)(1),
(2), (4) Date: Sep. 26, 2014

(87) PCT Pub. No.: WO2013/145193
PCT Pub. Date: Oct. 3, 2013

(65) Prior Publication Data
US 2015/0024895 A1  Jan. 22, 2015

(51) Int. Cl.
| B60K 6/365 | (2007.10) |
| B60K 6/547 | (2007.10) |
| B60K 6/445 | (2007.10) |
| B60K 6/387 | (2007.10) |
| F16H 3/46 | (2006.01) |
| B60K 6/38 | (2007.10) |
| F16H 37/10 | (2006.01) |

(52) U.S. Cl.
CPC ............ *B60K 6/547* (2013.01); *B60K 6/365* (2013.01); *B60K 6/387* (2013.01); *B60K 6/445* (2013.01); *F16H 3/46* (2013.01); *B60K 2006/381* (2013.01); *F16H 2037/106* (2013.01); *F16H 2200/2007* (2013.01); *F16H 2200/2035* (2013.01); *Y02T 10/6239* (2013.01); *Y10S 903/902* (2013.01)

(58) Field of Classification Search
CPC ................ B60K 2006/4816; F16H 2200/2035
See application file for complete search history.

(56) References Cited

U.S. PATENT DOCUMENTS

| 6,478,705 | B1 | 11/2002 | Holmes et al. | |
| 7,691,021 | B2* | 4/2010 | Cho | B60K 6/365 475/5 |
| 7,959,535 | B2* | 6/2011 | Matsubara | B60K 6/445 180/65.28 |
| 2008/0045365 | A1* | 2/2008 | Usoro | B60K 6/365 475/5 |
| 2009/0093330 | A1* | 4/2009 | Kumazaki | B60K 6/365 475/5 |
| 2010/0048338 | A1* | 2/2010 | Si | B60K 6/365 475/5 |
| 2010/0137091 | A1* | 6/2010 | Park | B60K 6/365 475/5 |

FOREIGN PATENT DOCUMENTS

JP    2002-281607 A    9/2002

* cited by examiner

Primary Examiner — Ramya Burgess
Assistant Examiner — David Morris
(74) Attorney, Agent, or Firm — Sughrue Mion, PLLC

(57) ABSTRACT

A driving device for hybrid vehicle provided with an engine, first and second electrical machines, a first and second differential mechanisms, and a switching device in which the first and second differential mechanisms are connected to each other through output rotational elements. The engine and the first and second rotating electrical machines are connected to different rotational elements out of rotational elements of the first and second differential mechanisms. The switching device switches between an independent mode and a four-element mode. In the four element mode, rotational elements connected to the engine, first and second rotating electrical machines, and the output rotational elements differentially rotate, and in an alignment chart in the four-element mode, any one of rotational elements connected to the first and second rotating electrical machines is located between a rotational element connected to the engine and the output rotational elements.

4 Claims, 10 Drawing Sheets

| | BK | CL |
|---|---|---|
| EV-1 | O | |
| EV-2 | O | O |
| HV-1 | O | |
| HV-2 | | O |

DRIVING DEVICE FOR HYBRID VEHICLE

CROSS REFERENCE TO RELATED APPLICATIONS

This application is a National Stage of International Application No. PCT/JP2012/058255 filed Mar. 28, 2012, the contents of which are incorporated herein by reference in their entirety.

FIELD

The present invention relates to a driving device for hybrid vehicle.

BACKGROUND

A driving device for hybrid vehicle is conventionally known. For example, Patent Literature 1 discloses technology of a power train capable of switching between two modes of an input split mode and a mixed split mode.

CITATION LIST

Patent Literature

Patent Literature 1: Specification of U.S. Pat. No. 6,478,705

SUMMARY

Technical Problem

A highly-efficient driving device for hybrid vehicle is desired. For example, it is preferable that efficiency at the time of reverse driving may be improved.

An object of the present invention is to provide the highly-efficient driving device for hybrid vehicle.

Solution to Problem

A driving device for hybrid vehicle according to the present invention includes an engine; a first rotating electrical machine; a second rotating electrical machine; a first differential mechanism; a second differential mechanism; and a switching device, wherein the first differential mechanism and the second differential mechanism are connected to each other through output rotational elements, the engine, the first rotating electrical machine, and the second rotating electrical machine are connected respectively to different rotational elements out of rotational elements of the first differential mechanism and the second differential mechanism, the switching device switches between an independent mode in which the first differential mechanism and the second differential mechanism differentially rotate independently of each other and a four-element mode in which one rotational element of the first differential mechanism and one rotational element of the second differential mechanism are connected to each other, in the four-element mode, a rotational element connected to the engine, a rotational element connected to the first rotating electrical machine, a rotational element connected to the second rotating electrical machine, and the output rotational elements differentially rotate, and in an alignment chart in the four-element mode, any one of the rotational element connected to the first rotating electrical machine and the rotational element connected to the second rotating electrical machine is located between the rotational element connected to the engine and the output rotational elements.

In the driving device for hybrid vehicle, it is preferable that in the alignment chart in the four-element mode, the rotational elements are arranged in following order: the rotational element connected to the first rotating electrical machine, the output rotational elements, the rotational element connected to the second rotating electrical machine, and the rotational element connected to the engine.

In the driving device for hybrid vehicle, it is preferable that in the alignment chart in the four-element mode, the rotational elements are arranged in following order: the rotational element connected to the first rotating electrical machine, the rotational element connected to the engine, the rotational element connected to the second rotating electrical machine, and the output rotational elements.

In the driving device for hybrid vehicle, it is preferable to include a first planetary gear mechanism as the first differential mechanism; a second planetary gear mechanism as the second differential mechanism; a clutch as the switching device; and a brake, wherein the rotational element connected to engine is a sun gear of the first planetary gear mechanism, the rotational element connected to the first rotating electrical machine is a ring gear of the first planetary gear mechanism, the rotational element connected to the second rotating electrical machine is a carrier of the second planetary gear mechanism, the output rotational elements are a carrier of the first planetary gear mechanism and a sun gear of the second planetary gear mechanism, a ring gear of the second planetary gear mechanism is connected to the sun gear of the first planetary gear mechanism and the engine through the clutch, and the brake regulates rotation of the ring gear of the second planetary gear mechanism.

In the driving device for hybrid vehicle, it is preferable to include a first planetary gear mechanism as the first differential mechanism; a second planetary gear mechanism as the second differential mechanism; a clutch as the switching device; and a brake, wherein the rotational element connected to the engine is a sun gear of the first planetary gear mechanism, the rotational element connected to the first rotating electrical machine is a ring gear of the first planetary gear mechanism, the rotational element connected to the second rotating electrical machine is a carrier of the second planetary gear mechanism, the output rotational elements are a carrier of the first rotating electrical machine and a ring gear of the second planetary gear mechanism, a sun gear of the second planetary gear mechanism is connected to the sun gear of the first planetary gear mechanism and the engine through the clutch, and the brake regulates rotation of the sun gear of the second planetary gear mechanism.

In the driving device for hybrid vehicle, it is preferable to include a first planetary gear mechanism as the first differential mechanism; a second planetary gear mechanism as the second differential mechanism; a clutch as the switching device; and a brake, wherein the rotational element connected to the engine is a carrier of the first planetary gear mechanism, the rotational element connected to the first rotating electrical machine is a ring gear of the first planetary gear mechanism, the rotational element connected to the second rotating electrical machine is a carrier of the second planetary gear mechanism, the output rotational elements are a sun gear of the first planetary gear mechanism and a sun gear of the second planetary gear mechanism, a ring gear of the second planetary gear mechanism is connected to the carrier of the first planetary gear mechanism and the engine through the clutch, and the brake regulates rotation of the ring gear of the second planetary gear mechanism.

In the driving device for hybrid vehicle, it is preferable to include a first planetary gear mechanism as the first differential mechanism; a second planetary gear mechanism as the second differential mechanism; a clutch as the switching device; and a brake, wherein the rotational element connected to the engine is a carrier of the first planetary gear mechanism, the rotational element connected to the first rotating electrical machine is a ring gear of the first planetary gear mechanism, the rotational element connected to the second rotating electrical machine is a carrier of the second planetary gear mechanism, the output rotational elements are a sun gear of the first planetary gear mechanism and a ring gear of the second planetary gear mechanism, a sun gear of the second planetary gear mechanism is connected to the carrier of the first planetary gear mechanism and the engine through the clutch, and the brake regulates rotation of the sun gear of the second planetary gear mechanism.

Advantageous Effects of Invention

A driving device for hybrid vehicle according to the present invention is provided with an engine, a first rotating electrical machine, a second rotating electrical machine, a first differential mechanism, a second differential mechanism, and a switching device. The first differential mechanism and the second differential mechanism are connected to each other through output rotational elements, and the engine, the first rotating electrical machine, and the second rotating electrical machine are connected respectively to different rotational elements out of rotational elements of the first differential mechanism and the second differential mechanism. The switching device switches between an independent mode in which the first differential mechanism and the second differential mechanism differentially rotate independently of each other and a four-element mode in which one rotational element of the first differential mechanism and one rotational element of the second differential mechanism are connected to each other.

In the four-element mode, a rotational element connected to the engine, a rotational element connected to the first rotating electrical machine, a rotational element connected to the second rotating electrical machine, and the output rotational elements differentially rotate. In an alignment chart in the four-element mode, any one of the rotational element connected to the first rotating electrical machine and the rotational element connected to the second rotating electrical machine is located between the rotational element connected to the engine and the output rotational elements. The driving device for hybrid vehicle according to the present invention has an effect that deterioration in effective driving force at the time of reverse driving may be inhibited, for example.

DESCRIPTION OF EMBODIMENTS

A driving device for hybrid vehicle according to embodiments of the present invention is hereinafter described in detail with reference to the drawings. Meanwhile, the present invention is not limited by the embodiments. Components in the following embodiments include a component easily conceived of by one skilled in the art or a substantially identical component.

[First Embodiment]

Figures 1, 2:
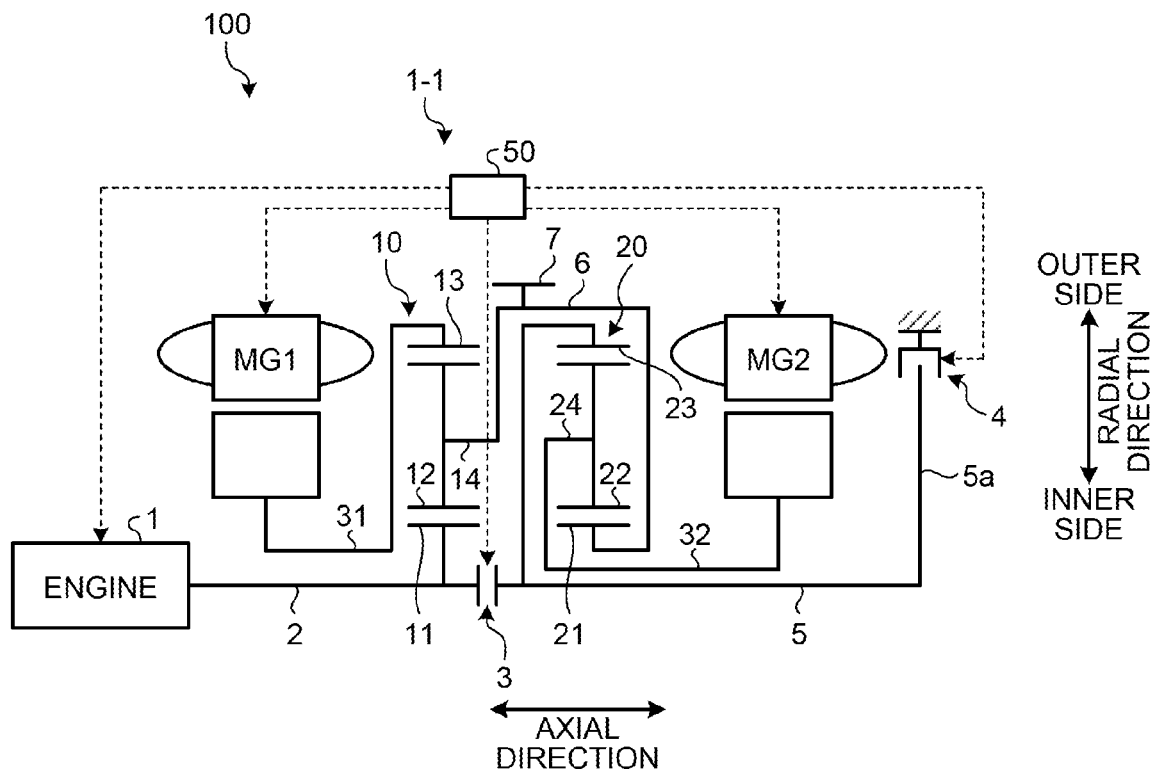
FIG. 1 is a skeleton diagram of a vehicle according to a first embodiment.
FIG. 2 is a view of an engagement table of a driving device for hybrid vehicle according to the first embodiment.

A first embodiment is described with reference to FIGS. 1 to 6. This embodiment relates to a driving device for hybrid vehicle. FIG. 1 is a skeleton diagram of a vehicle according to the first embodiment of the present invention and FIG. 2 is a view of an engagement table of the driving device for hybrid vehicle according to the first embodiment.

A vehicle 100 illustrated in FIG. 1 being a hybrid vehicle includes an engine 1, a first rotating electrical machine MG1, a second rotating electrical machine MG2, a first planetary gear mechanism 10, a second planetary gear mechanism 20, a clutch 3, and a brake 4. A driving device for hybrid vehicle 1-1 according to this embodiment includes the engine 1, the first rotating electrical machine MG1, the second rotating electrical machine MG2, the first planetary gear mechanism 10, the second planetary gear mechanism 20, and the clutch 3. The driving device for hybrid vehicle 1-1 may further include the brake 4 and an ECU 50.

In this embodiment, the first planetary gear mechanism 10 corresponds to a first differential mechanism, the second planetary gear mechanism 20 corresponds to a second differential mechanism, and the clutch 3 corresponds to a switching device. Meanwhile, the first and second differential mechanisms are not limited to the planetary gear mechanisms 10 and 20. For example, each differential mechanism may be a Ravigneaux planetary gear mechanism or another known differential mechanism, the differential mechanism capable of switching between an independent mode and a four-element mode to be described later. The switching device is not limited to the clutch 3.

The engine 1 converts combustion energy of fuel to rotary motion of a rotary shaft 2 to output. The engine 1 is arranged such that the rotary shaft 2 extends in a vehicle width direction, for example. Meanwhile, it is also possible that another known engine is mounted on the vehicle 100 in place of the engine 1. The rotary shaft 2 is connected to a first sun gear 11 of the first planetary gear mechanism 10. That is to say, the first sun gear 11 is a rotational element connected to the engine 1.

The first planetary gear mechanism 10 is a single-pinion type and includes the first sun gear 11, a first pinion gear 12, a first ring gear 13, and a first carrier 14. The first ring gear 13 is arranged coaxially with the first sun gear 11 on an outer side in a radial direction of the first sun gear 11. The first pinion gear 12 is arranged between the first sun gear 11 and the first ring gear 13 so as to mesh with the first sun gear 11 and the first ring gear 13. The first pinion gear 12 is supported by the first carrier 14 so as to be rotatable.

The first carrier 14 is supported coaxially with the rotary shaft 2 so as to be rotatable. Therefore, the first pinion gear 12 may rotate (revolve) around a central axis of the rotary shaft 2 together with the first carrier 14 and may rotate (rotate) around a central axis of the first pinion gear 12 while being supported by the first carrier 14.

The first planetary gear mechanism 10 has a function as a power dividing planetary which divides power of the engine 1 to an output side and a side of the first rotating electrical machine MG1.

The second planetary gear mechanism 20 is arranged coaxially with the first planetary gear mechanism 10 so as to be adjacent to the first planetary gear mechanism 10. The first rotating electrical machine MG1, the first planetary gear mechanism 10, the clutch 3, an output gear 7, the second planetary gear mechanism 20, the second rotating electrical machine MG2, and the brake 4 are arranged coaxially with the rotary shaft 2 in this order from a side of the engine 1.

The second planetary gear mechanism 20 is a single-pinion type and includes a second sun gear 21, a second pinion gear 22, a second ring gear 23, and a second carrier 24. The second ring gear 23 is arranged coaxially with the second sun gear 21 on an outer side in a radial direction of the second sun gear 21. The second pinion gear 22 is arranged between the second sun gear 21 and the second ring gear 23 so as to mesh with the second sun gear 21 and the second ring gear 23. The second pinion gear 22 is supported by the second carrier 24 so as to be rotatable.

The second carrier 24 is connected to a rotary shaft 32 of the second rotating electrical machine MG2. The rotary shaft 32 is supported coaxially with the rotary shaft 2 so as to be rotatable. Therefore, the second pinion gear 22 may rotate (revolve) around the central axis of the rotary shaft 2 together with the second carrier 24 and may rotate (rotate) around a central axis of the second pinion gear 22 while being supported by the second carrier 24. In this embodiment, the second carrier 24 corresponds to a rotational element connected to the second rotating electrical machine MG2.

The first ring gear 13 is connected to a rotary shaft 31 of the first rotating electrical machine MG1. That is to say, the first ring gear 13 is a rotational element connected to the first rotating electrical machine MG1. The first carrier 14 is connected to the second sun gear 21 through a connecting member 6. The connecting member 6 having a cylindrical shape is arranged on an outer side in a radial direction of the second planetary gear mechanism 20. The output gear 7 is provided on an outer periphery of the connecting member 6. The output gear 7 is a gear arranged on an output shaft of the first planetary gear mechanism 10 and the second planetary gear mechanism 20 and is connected to a drive wheel of the vehicle 100 through a deceleration mechanism and the like. That is to say, the output gear 7 is the gear which outputs power of the engine 1, the first rotating electrical machine MG1, and the second rotating electrical machine MG2 to the drive wheel. In this embodiment, the first carrier 14 and the second sun gear 21 correspond to output rotational elements and the first planetary gear mechanism 10 and the second planetary gear mechanism 20 are connected to each other through the output rotational elements.

As described above, the engine, the first rotating electrical machine MG1, and the second rotating electrical machine MG2 are connected respectively to different rotational elements out of the rotational elements 11, 13, 14, 21, 23, and 24 of the first planetary gear mechanism 10 and the second planetary gear mechanism 20, the rotational elements other than the output rotational elements 14 and 21.

The second ring gear 23 is connected to a rotary shaft 5. The rotary shaft 5 is arranged coaxially with the rotary shaft 2 on an extended line of the rotary shaft 2. The clutch 3 is a clutch device capable of engaging and disengaging the rotary shaft 2 with and from the rotary shaft 5. That is to say, the second ring gear 23 is connected to the first sun gear 11 and the engine 1 through the rotary shaft 5 and the clutch 3.

The clutch 3 is a friction engaging or meshing clutch device, for example. The clutch 3 includes an input side engaging member connected to the rotary shaft 2 and an output side engaging member connected to the rotary shaft 5. The clutch 3 connects the rotary shaft 2 to the rotary shaft 5 by engaging the input side engaging member with the output side engaging member. The clutch 3 disengages the input side engaging member from the output side engaging member, thereby interrupting power transmission between the rotary shaft 2 and the rotary shaft 5.

The brake 4 regulates rotation of the second ring gear 23. Specifically, the brake 4 regulates rotation of an engaging unit 5a of the rotary shaft 5. The engaging unit 5a is a circular plate arranged on an end on a side opposite to the engine of the rotary shaft 5. The brake 4 regulates the rotation of the second ring gear 23 by engaging with the engaging unit 5a. The brake 4 may be a friction engaging type or a meshing type, for example.

When the clutch 3 and the brake 4 are the meshing clutch such as a dog teeth meshing type, drag loss at non-engaging time is small as compared to that of a clutch with a wet frictional material, so that high efficiency may be realized. An actuator of the meshing clutch may be an electromagnetic type. In this case, a hydraulic circuit is not necessary and it is possible to realize simple and light T/A.

Each of the first rotating electrical machine MG1 and the second rotating electrical machine MG2 has a function as a motor (electric motor) and a function as a generator. The first rotating electrical machine MG1 and the second rotating electrical machine MG2 are connected to a battery through an inverter. The first rotating electrical machine MG1 and the second rotating electrical machine MG2 may convert electric power supplied from the battery to mechanical power to output and may be driven by input power to convert the mechanical power to the electric power. The electric power generated by the rotating electrical machines MG1 and MG2 may be accumulated in the battery. An AC synchronous motor-generator may be used, for example, as the first rotating electrical machine MG1 and the second rotating electrical machine MG2.

The vehicle 100 is provided with the ECU 50. The ECU 50 is an electronic control unit including a computer. The ECU 50 has a function as a control device to control each unit of the vehicle 100. The ECU 50 is connected to the engine 1, the first rotating electrical machine MG1, the second rotating electrical machine MG2, the clutch 3, and the brake 4 and may control the engine 1, the first rotating electrical machine MG1, the second rotating electrical machine MG2, the clutch 3, and the brake 4.

For example, the ECU 50 may control torque and a rotational speed of the engine 1 by fuel injection control, ignition control, electronic throttle control and the like of the engine 1. The ECU 50 may control a rotational speed and torque of the first rotating electrical machine MG1 and the second rotating electrical machine MG2. The ECU 50 may control an engaging/disengaging state of the clutch 3 and the brake 4 by controlling hydraulic pressure supplied from a hydraulic control device not illustrated to the clutch 3 and the brake 4.

Sensors which detect a vehicle speed, an accelerator position, the rotational speed of the first rotating electrical machine MG1 (hereinafter, sometimes simply referred to as "MG1 rotational speed"), the rotational speed of the second rotating electrical machine MG2 (hereinafter, sometimes simply referred to as "MG2 rotational speed"), a rotational speed of the output shaft, a battery condition and the like are connected to the ECU 50. The ECU 50 may calculate a required output to the vehicle 100 and control the engine 1, the rotating electrical machines MG1 and MG2, the clutch 3, the brake 4 and the like based on information obtained from each sensor.

As illustrated in FIG. 2, the vehicle 100 has two EV driving modes which are an EV-1 mode and an EV-2 mode, and two HV driving modes which are an HV-1 mode and an HV-2 mode. In the engagement table in FIG. 2, BK represents the brake 4 and CL represents the clutch 3. In each field, a circle represents engagement and a blank field represents disengagement. EV driving is a driving mode to drive the vehicle 100 by using at least any of the first rotating electrical machine MG1 and the second rotating electrical machine MG2 as a power source. In the EV driving mode, it is possible to drive the vehicle 100 while stopping operation of the engine 1.

HV driving is a driving mode to drive the vehicle 100 by using at least the engine 1 as the power source. In the HV driving mode, it is possible to use at least any one of the first rotating electrical machine MG1 and the second rotating electrical machine MG2 as the power source in addition to the engine 1.

The clutch 3 may switch between the independent mode and the four-element mode. In the driving device for hybrid vehicle 1-1 according to this embodiment, it is possible to allow the first planetary gear mechanism 10 and the second planetary gear mechanism 20 to function in the independent mode by disengaging the clutch 3. The independent mode is a mode in which the first planetary gear mechanism 10 and the second planetary gear mechanism 20 differentially rotate independently of each other. In the independent mode, the first planetary gear mechanism 10 and the second planetary gear mechanism 20 may differentially rotate independently while the first carrier 14 and the second sun gear 21 rotate at the same rotational speed.

In the driving device for hybrid vehicle 1-1, it is possible to allow the first planetary gear mechanism 10 and the second planetary gear mechanism 20 to function as the differential mechanism in the four-element mode by engaging the clutch 3. The four-element mode is a mode in which one rotational element of the first planetary gear mechanism 10 and one rotational element of the second planetary gear mechanism 20 are connected to each other.

In the four-element mode, one rotational element other than the output rotational element of the first planetary gear mechanism 10 and one rotational element other than the output rotational element of the second planetary gear mechanism 20 are connected to each other in addition to the connection of the first planetary gear mechanism 10 and the second planetary gear mechanism 20 by the output rotational elements. According to this, independent differential rotation of the first planetary gear mechanism 10 and the second planetary gear mechanism 20 is regulated. The first planetary gear mechanism 10 and the second planetary gear mechanism 20 function as one differential mechanism including four rotational elements in a state in which they are connected to each other through the two rotational elements. One of the rotational elements connected to each other in the four-element mode is preferably the rotational element connected to the engine 1 and the other one is preferably a rotational element connected to the brake 4.

Figure 3:
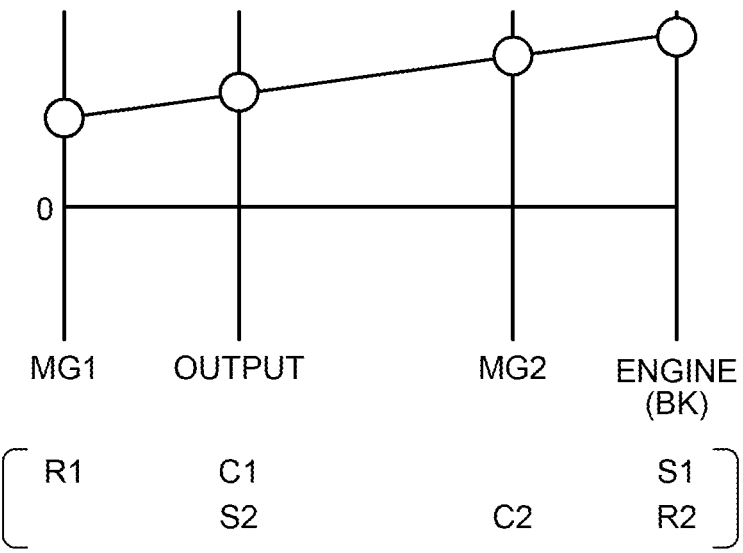
FIG. 3 is an alignment chart in a four-element mode of the driving device for hybrid vehicle according to the first embodiment.

FIG. 3 is an alignment chart in the four-element mode of the driving device for hybrid vehicle according to the first embodiment. The first sun gear 11 and the second ring gear 23 are connected to each other by the engagement of the clutch 3. According to this, the first sun gear 11 and the second ring gear 23 become integrally rotating one rotational element.

In this case, the first planetary gear mechanism 10 and the second planetary gear mechanism 20 are put into the four-element mode in which the first sun gear 11 and the second ring gear 23 connected to the engine 1, the first ring gear 13 connected to the first rotating electrical machine MG1, the second carrier 24 connected to the second rotating electrical machine MG2, and the first carrier 14 and the second sun gear 21 as the output rotational elements differentially rotate. In the four-element mode, the four rotational elements may transmit the power while differentially rotating.

As illustrated in FIG. 3, in the four-element mode, the rotational speeds of the four rotational elements are linearly arranged. That is to say, the rotational speed of the first ring gear 13 and the first rotating electrical machine MG1, the rotational speed of the first carrier 14 and the second sun gear 21 being the output rotational elements, the rotational speed of the second carrier 24 and the second rotating electrical machine MG2, and the rotational speed of the engine 1, the first sun gear 11, and the second ring gear 23 are located on a same straight line. Meanwhile, reference signs S1, C1, R1, S2, C2, and R2 represent the first sun gear 11, the first carrier 14, the first ring gear 13, the second sun gear 21, the second carrier 24, and the second ring gear 23, respectively.

As illustrated in FIG. 2, the ECU 50 engages the clutch 3 in the EV-2 mode and the HV-2 mode. That is to say, in the EV-2 mode and the HV-2 mode, it is driven with the differential mechanisms in the four-element mode.

(EV-1 Mode)

The ECU 50 engages the brake 4 and disengages the clutch 3 in the EV-1 mode. The rotation of the second ring gear 23 is regulated by the engagement of the brake 4. Therefore, the second ring gear 23 becomes a reaction force receiver for output torque of the second rotating electrical machine MG2 (hereinafter, also referred to as "MG2 torque") and it becomes possible to output the power from the second sun gear 21 to the output gear 7. That is to say, it is possible to drive the vehicle 100 by using the second rotating electrical machine MG2 as the power source in the EV-1 mode. In the EV-1 mode, it is possible to move the vehicle 100 forward and rearward by switching a rotational direction of the second rotating electrical machine MG2.

(EV-2 Mode)

The ECU 50 engages the brake 4 and engages the clutch 3 in the EV-2 mode. The rotation of the second ring gear 23 is regulated by the engagement of the brake 4. Furthermore, the first sun gear 11 and the engine 1 are connected to the second ring gear 23 by the engagement of the clutch 3. Therefore, in the EV-2 mode, the rotation of the second ring gear 23 the first sun gear 11, and the engine 1 is regulated.

The first sun gear 11 the rotation of which is regulated becomes the reaction force receiver for torque of the first rotating electrical machine MG1 (hereinafter, also referred to as "MG1 torque") and it is possible to output the power from the first carrier 14 to the output gear 7. The second ring gear 23 the rotation of which is regulated becomes the reaction force receiver for the MG2 torque and it is possible to output the power from the second sun gear 21 to the output gear 7. That is to say, in the EV-2 mode, it is possible to drive the vehicle 100 by using any one of the first rotating electrical machine MG1 and the second rotating electrical machine MG2 as the power source and to drive the vehicle 100 by using the first rotating electrical machine MG1 and the second rotating electrical machine MG2 as the power sources. In the EV-2 mode, it is possible to move the vehicle 100 forward and rearward by switching the rotational directions of the first and second rotating electrical machines MG1 and MG2.

(HV-1 Mode)

The ECU 50 engages the brake 4 and disengages the clutch 3 in the HV-1 mode. The rotation of the second ring gear 23 is regulated by the engagement of the brake 4. Therefore, the second ring gear 23 becomes the reaction force receiver for the MG2 torque and it is possible to output the power from the second sun gear 21 to the output gear 7.

The first rotating electrical machine MG1 becomes the reaction force receiver for engine torque and it is possible to output the power from the first carrier 14 to the output gear 7. Alternatively, the first rotating electrical machine MG1 may output assist torque by power running.

(HV-2 Mode)

Figure 4:
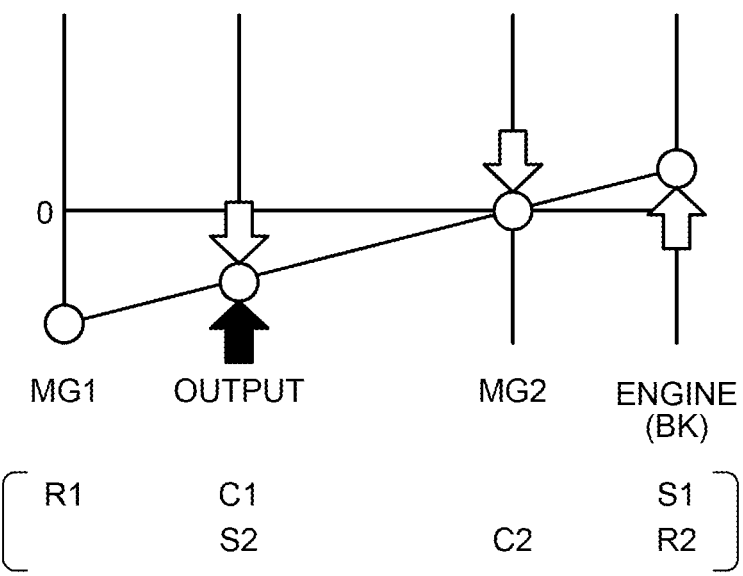
FIG. 4 is an alignment chart at the time of reverse driving in a HV-2 mode.
Figure 5:
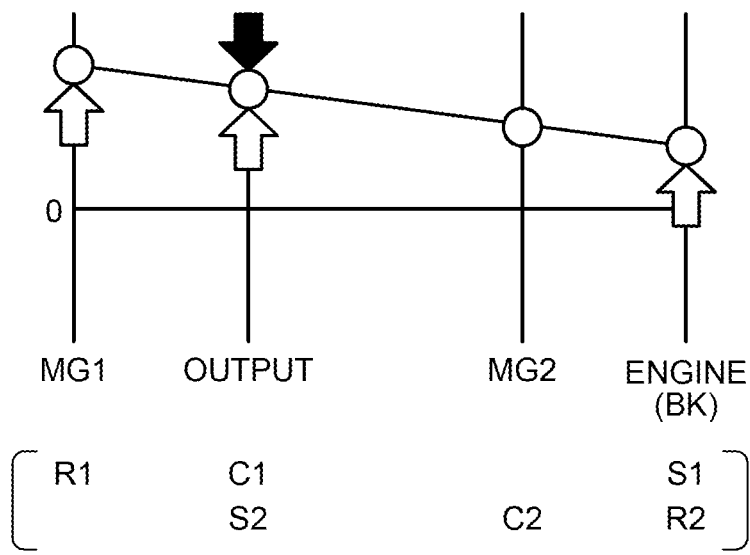
FIG. 5 is an alignment chart at the time of forward movement in the HV-2 mode.

The ECU 50 disengages the brake 4 and engages the clutch 3 in the HV-2 mode. The first planetary gear mechanism 10 and the second planetary gear mechanism 20 function as the differential mechanism in the four-element mode by the engagement of the clutch 3. FIG. 4 is an alignment chart at the time of reverse driving in the HV-2 mode and FIG. 5 is an alignment chart at the time of forward movement in the HV-2 mode.

In the alignment chart in the four-element mode, the rotational elements are arranged in following order: the first ring gear 13, the first carrier 14 and the second sun gear 21, the second carrier 24, and the first sun gear 11 and the second ring gear 23. That is to say, in the alignment chart in the four-element mode, the rotational element connected to the second rotating electrical machine MG2 (second carrier 24) is located between the rotational element connected to the engine 1 (first sun gear 11) and the output rotational elements (first carrier 14 and the second sun gear 21).

According to this, in the driving device for hybrid vehicle 1-1 according to this embodiment, the reverse driving (rearward movement) may be performed by engine direct torque and driving force at the time of the reverse driving may be enlarged.

As illustrated in FIG. 4, the ECU 50 allows the second rotating electrical machine MG2 to function as the reaction force receiver for the engine 1 at the time of the reverse driving in the HV-2 mode. The second rotating electrical machine MG2 outputs reaction torque for the engine torque and outputs the power to the output gear 7. At that time, the second rotating electrical machine MG2 outputs negative torque. Meanwhile, the negative torque is torque in a negative rotational direction. The negative rotational direction is the rotational direction opposite to a positive rotational direction which is a rotational direction of the output gear 7 at the time of the forward movement of the vehicle 100. The second rotating electrical machine MG2 may generate the reaction torque by the power generation when it is controlled such that the second rotating electrical machine MG2 rotates in the positive rotational direction in the reverse driving.

At the time of the reverse driving, the first rotating electrical machine MG1 may generate the assist torque, generate the electric power, and run idle without the power running and the power generation. The ECU 50 may determine operation of the first rotating electrical machine MG1 at the time of the reverse driving based on a state of charge SOC of the battery, for example.

In the driving device for hybrid vehicle 1-1 according to this embodiment, it is possible to drive the vehicle 100 in reverse by the direct torque of the engine 1 in the HV-2 mode. In the alignment chart, the rotational element connected to the second rotating electrical machine MG2 is located between the rotational element connected to the engine 1 and the output rotational elements. By making the second rotating electrical machine MG2 the reaction force receiver, it is possible to convert positive rotation positive torque of the engine 1 to negative rotation negative torque to output from the output rotational element. Therefore, the driving force at the time of the reverse driving may be enlarged.

For example, at the time of the reverse driving in a state in which the engine is running in the HV-1 mode, engine output torque acts in a direction to prevent driving torque, so that effective driving force is deteriorated. In contrast, in the driving device for hybrid vehicle 1-1 according to this embodiment, efficiency at the time of the reverse driving may be improved by the reverse driving in the HV-2 mode in the four-element mode. The ECU 50 may select the HV-2 mode in a case of the reverse driving or when the reverse driving is predicted, for example, and may appropriately select the HV-1 mode or the HV-2 mode in other cases. According to this, it is possible to drive while selecting a highly-efficient HV mode depending on a driving condition, for example.

Out of the driving devices in which the four-element mode is possible, there is the device in which the engine torque acts in the direction to prevent the driving torque at the time of the reverse driving depending on the order of arrangement in the alignment chart. For example, in the alignment chart in the four-element mode, when the rotational element connected to the engine 1 and the output rotational elements are located between the rotational element connected to the first rotating electrical machine MG1 and the rotational element connected to the second rotating electrical machine MG2, the engine torque acts in the direction to prevent the driving torque at the time of the reverse driving in the state in which the engine 1 running. As a result, the effective driving force at the time of the reverse driving is problematically deteriorated. In contrast, in the driving device for hybrid vehicle 1-1 according to this embodiment, it is possible to drive the vehicle 100 in reverse by the direct torque of the engine 1. Therefore, it is possible to ensure sufficient driving force at the time of the reverse driving, thereby enlarging a reverse driving region.

The driving device for hybrid vehicle 1-1 may transmit the engine torque to the output rotational element with high efficiency by making the rotational speed of the second rotating electrical machine MG2 low. For example, when the rotational speed of the second rotating electrical machine MG2 is set to 0, an electrical path becomes 0 and highly-efficient operation becomes possible. In the reverse driving in the HV-2 mode, the power running by using the first rotating electrical machine MG1 as the power source may be performed and the driving force at the time of the reverse driving may be enlarged.

As illustrated in FIG. 5, the ECU 50 allows the first rotating electrical machine MG1 to function as the reaction force receiver of the engine 1 at the time of the forward movement in the HV-2 mode. The first rotating electrical machine MG1 outputs the reaction torque for the engine torque and outputs the power to the output gear 7. At that time, the first rotating electrical machine MG1 outputs positive torque. That is to say, the first rotating electrical machine MG1 may output the reaction torque by the power running.

The second rotating electrical, machine MG2 may generate the assist torque, generate the electric power, and run idle without the power running and the power generation at the time of the forward movement. The ECU 50 may charge the battery by allowing the second rotating electrical machine MG2 to generate the electric power so as to hold the state of charge SOC of the battery, for example.

Figure 6:
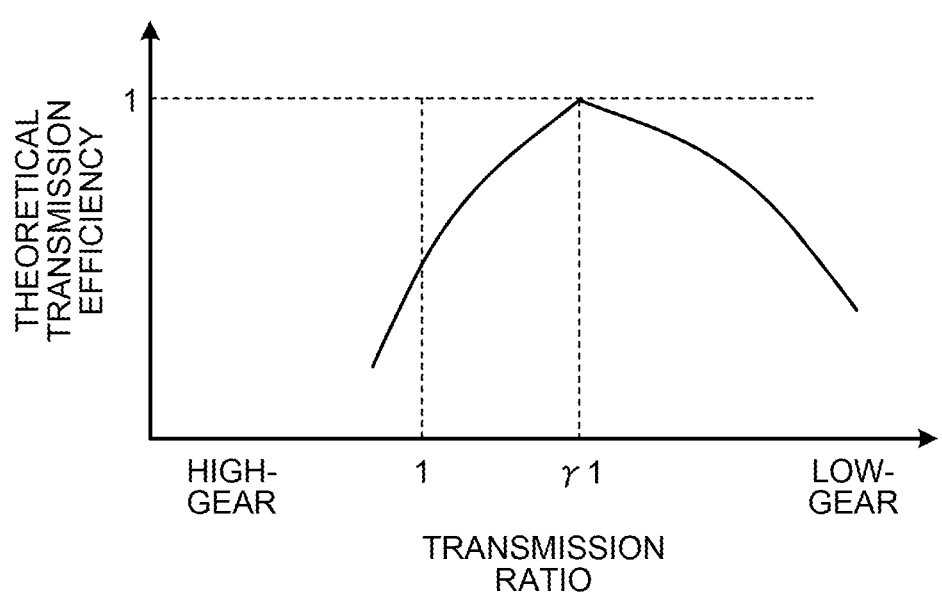
FIG. 6 is a view of theoretical transmission efficiency of the driving device for hybrid vehicle according to the first embodiment.

As described below, in the driving device for hybrid vehicle 1-1 according to this embodiment, a mechanical point when the first rotating electrical machine MG1 receives engine reaction force may be formed on a low-gear side. Therefore, it is possible to form a hybrid system excellent in efficiency at a low speed. FIG. 6 is a view of theoretical transmission efficiency of the driving device for hybrid vehicle 1-1 according to this embodiment.

In FIG. 6, a transmission ratio and the theoretical transmission efficiency are plotted along the abscissa and the ordinate, respectively. Herein, the transmission ratio is a ratio of an input side rotational speed to an output side rotational speed of the first planetary gear mechanism 10 and the second planetary gear mechanism 20 (reduction ratio) and indicates a ratio of the rotational speed of the first sun gear 11 to the rotational speed of the first carrier 14 and the second sun gear 21, for example. On the abscissa, a left side is a high-gear side on which the transmission ratio is small and a right side is a low-gear side on which the transmission ratio is large. The theoretical transmission efficiency reaches maximum efficiency 1 when entire power input to the planetary gear mechanisms 10 and 20 is transmitted to the output gear 7 by mechanical transmission without the electrical path.

As illustrated in FIG. 6, the theoretical transmission efficiency reaches the maximum efficiency at a transmission ratio γ1. The transmission ratio γ1 is the transmission ratio at which the rotational speed of the first rotating electrical machine MG1 (first ring gear 13) is set to 0. At the transmission ratio γ1, the electrical path by reception of the reaction force by the first rotating electrical machine MG1 is not generated and the power may be transmitted from the engine 1 to the output gear 7 only by the mechanical transmission of the power. The transmission ratio γ1 is the transmission ratio on an underdrive side, that is to say, the transmission ratio larger than the equal speed ratio. Therefore, the driving device for hybrid vehicle 1-1 may operate with high efficiency in the driving condition in which the rotational speed of the output rotational elements is lower than the rotational speed of the rotational element connected to the engine 1.

Meanwhile, another mechanical point of the driving device for hybrid vehicle 1-1 is the mechanical point when the second rotating electrical machine MG2 receives the engine reaction force. This is an operation point on which the rotational speed of the second rotating electrical machine MG2 is set to 0 at the time of the reverse driving in the HV-2 mode as described above. That is to say, another mechanical point occurs on a reverse side, in other words, in a region of a negative transmission ratio.

In the driving device for hybrid vehicle 1-1 according to this embodiment, only the rotational speeds of the output rotational elements of the two planetary gear mechanisms 10 and 20 are the same, and different rotational speeds may be selected for other parts of the two planetary gear mechanisms 10 and 20 at the time of the driving in a three-element mode in which the clutch 3 is disengaged. According to this, the rotational speed of a motor such as the engine 1 and the rotational speed of the second rotating electrical machine MG2 as the power sources may be selected without relationship, so that a highly-efficient operation point may be selected for each of them.

The driving device for hybrid vehicle 1-1 has the EV-2 mode in which the two rotating electrical machines MG1 and MG2 act as the power sources. According to this, it becomes possible to generate (or regenerate) the torque by any one of or both of the first rotating electrical machine MG1 and the second rotating electrical machine MG2. Therefore, the operation at the highly-efficient operation point may be performed and restriction such as torque limitation by heat might be relaxed.

The driving device for hybrid vehicle 1-1 according to this embodiment may form the output shaft at an outermost diameter, so that this may be easily applied to a FF structure in which a polyaxial configuration is required.

[First Variation of First Embodiment]

Figure 7:
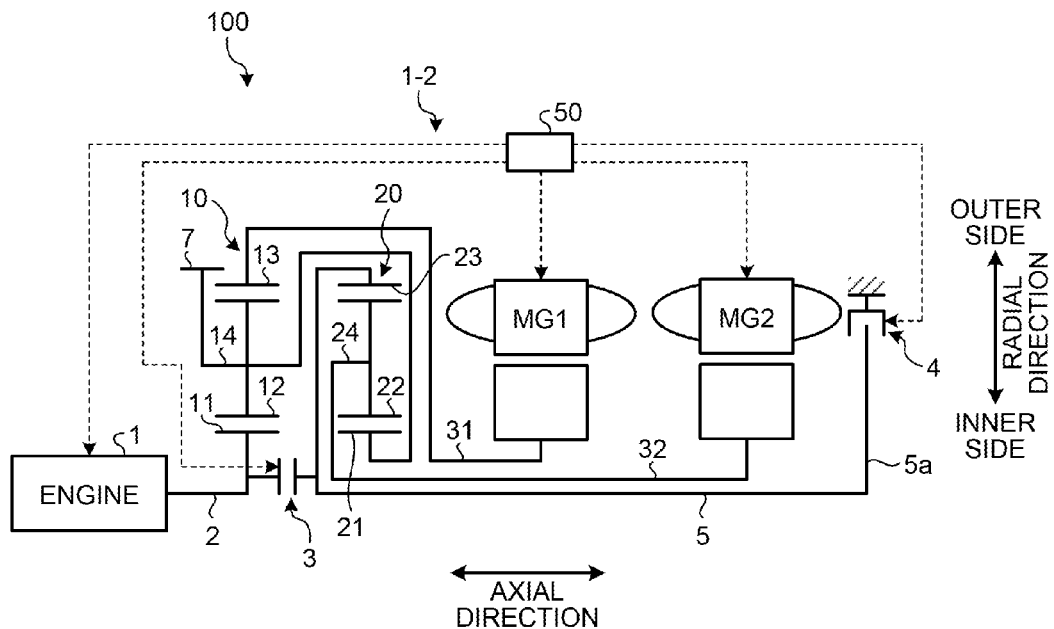
FIG. 7 is a skeleton diagram of a vehicle according to a first variation of the first embodiment.

A first variation of the first embodiment is described. FIG. 7 is a skeleton diagram of a vehicle according to the first variation. A driving device for hybrid vehicle 1-2 according to this variation is different from the driving device for hybrid vehicle 1-1 (FIG. 1) of the above-described first embodiment in an arrangement in an axial direction of each component.

As illustrated in FIG. 7, an output gear 7, a first planetary gear mechanism 10, a clutch 3, a second planetary gear mechanism 20, a first rotating electrical machine MG1, a second rotating electrical machine MG2, and a brake 4 are arranged coaxially with a rotary shaft 2 of an engine 1 in this order from a side of the engine 1. Connection relationship among the engine 1, the first rotating electrical machine MG1, and the second rotating electrical machine MG2, and rotational elements of the planetary gear mechanisms 10 and 20 is the same as that of the above-described first embodiment.

In the driving device for hybrid vehicle 1-2 according to this variation, it is possible to collectively arrange electrical components such as the rotating electrical machines MG1 and MG2 and mechanical components such as the planetary gear mechanisms 10 and 20 and the clutch 3, respectively. This offers a manufacturing advantage. For example, it is possible to make assembly of the electrical components and that of the mechanical components in different cases in different factories, respectively. Therefore, it is possible to decrease space and weight of the components to be transported. Inspection after the assembly and initial setting may be separately carried out at a component stage. It becomes not necessary to bring the mechanical components in a clean room when mounting the electrical components. This offers an advantage that a cleaning degree may be optionally set for each component and unnecessary cleaning is not required.

[Second Variation of First Embodiment]

Figure 8:
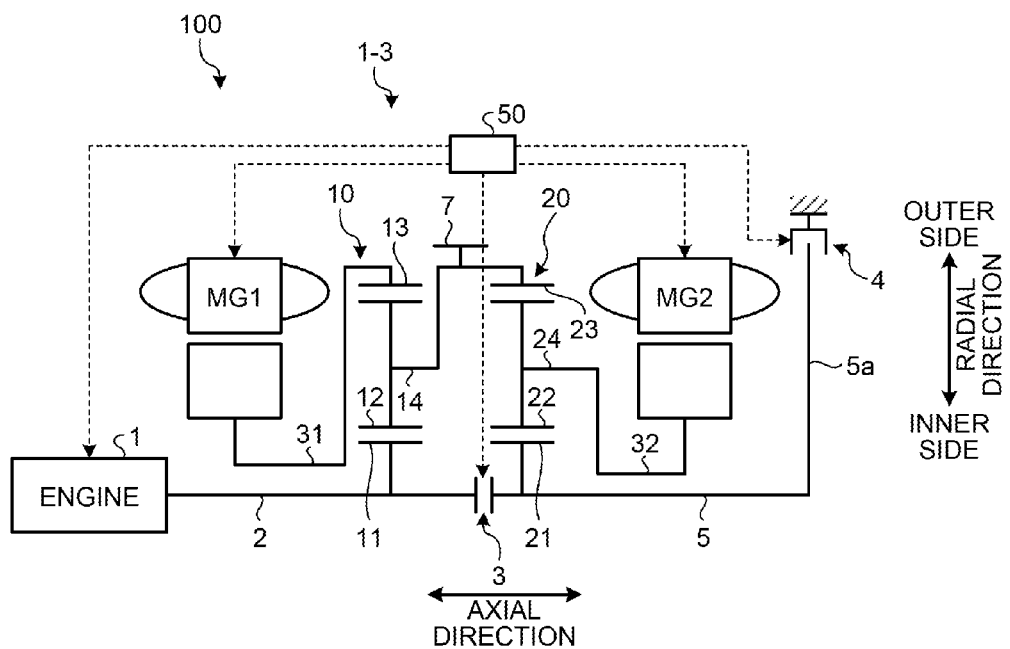
FIG. 8 is a skeleton diagram of a vehicle according to a second variation of the first embodiment.

A second variation of the first embodiment is described. FIG. 8 is a skeleton diagram of a vehicle according to the second variation of the first embodiment. A driving device for hybrid vehicle 1-3 according to this variation is different from the vehicle 100 of the above-described first embodiment in that a rotational element connected to a brake 4 and an output rotational element are changed in a second planetary gear mechanism 20.

As illustrated in FIG. 8, in the second planetary gear mechanism 20, the output rotational element is a second ring gear 23 and the rotational element connected to the brake 4 is a second sun gear 21. The second ring gear 23 is connected to a first carrier 14 and integrally rotates with the first carrier 14. The second sun gear 21 is connected to a rotary shaft 5 and integrally rotates with the rotary shaft 5. That is to say, the second sun gear 21 is connected to a first sun gear 11 and an engine through the rotary shaft 5 and a clutch 3.

As in the case of the driving device for hybrid vehicle 1-1 of the above-described first embodiment, a rotational element connected to the engine 1 is the first sun gear 11, a rotational element connected to a first rotating electrical machine MG1 is a first ring gear 13, and a rotational element connected to a second rotating electrical machine MG2 is a second carrier 24. Different from the driving device for hybrid vehicle 1-1 of the above-described first embodiment, the output rotational elements are the first carrier 14 and the second ring gear 23 and the brake 4 regulates rotation of the second sun gear 21.

Figure 9:
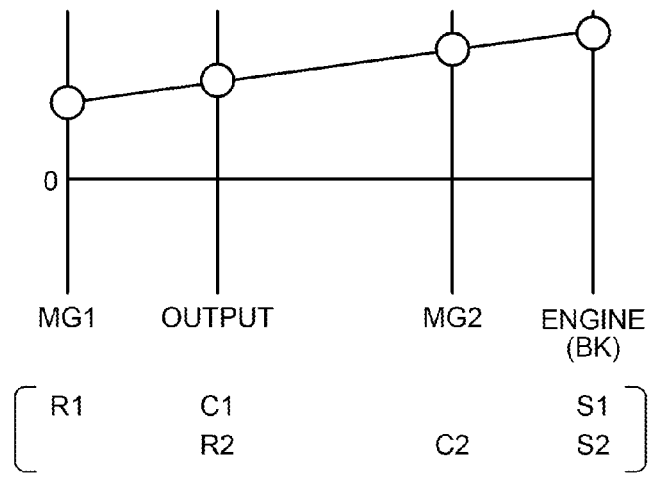
FIG. 9 is an alignment chart in a four-element mode of a driving device for hybrid vehicle according to the second variation of the first embodiment.

FIG. 9 is an alignment chart in a four-element mode of the driving device for hybrid vehicle 1-3 according to this variation. As in the case of the driving device for hybrid vehicle 1-1 of the above-described first embodiment, the rotational elements in the alignment chart in the four-element mode are arranged in following order: the rotational element connected to the first rotating electrical machine MG1, the output rotational elements, the rotational element connected to the second rotating electrical machine MG2, and the rotational element connected to the engine 1. Therefore, the driving device for hybrid vehicle 1-3 according to this variation may obtain an effect similar to that of the driving device for hybrid vehicle 1-1 of the above-described first embodiment and the driving device for hybrid vehicle 1-2 of the above-described first variation.

[Third Variation of First Embodiment]

Figure 10:
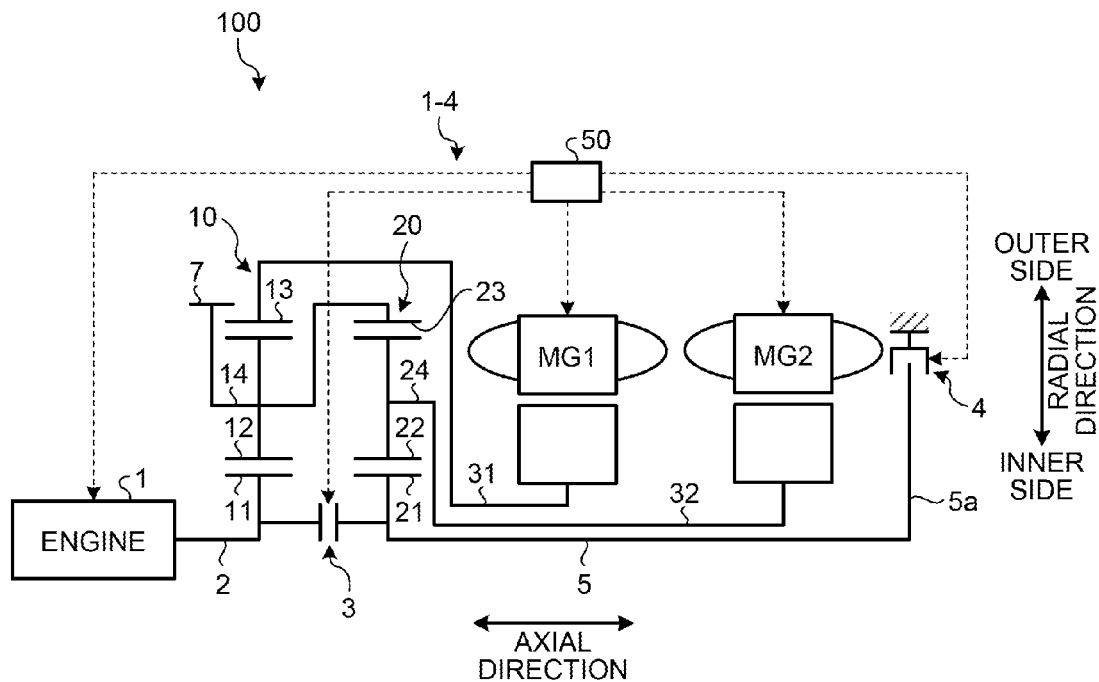
FIG. 10 is a skeleton diagram of a vehicle according to a third variation of the first embodiment.

A third variation of the first embodiment is described. FIG. 10 is a skeleton diagram of a vehicle according to the third variation of the first embodiment. A driving device for hybrid vehicle 1-4 according to this variation is different from the driving device for hybrid vehicle 1-3 of the above-described second variation in an arrangement of each component in an axial direction.

As illustrated in FIG. 10, an output gear 7, a first planetary gear mechanism 10, a clutch 3, a second planetary gear mechanism 20, a first rotating electrical machine MG1, a second rotating electrical machine MG2, and a brake 4 are arranged coaxially with a rotary shaft 2 of an engine 1 in this order from a side of the engine 1. Connection relationship among the engine 1, the first rotating electrical machine MG1, and the second rotating electrical machine MG2, and rotational elements of the planetary gear mechanisms 10 and 20 is the same as that of the above-described second variation. In the driving device for hybrid vehicle 1-4 according to this variation, it is possible to collectively arrange electrical components such as the rotating electrical machines MG1 and MG2 and mechanical components such as the planetary gear mechanisms 10 and 20 and the clutch 3, respectively.

[Second Embodiment]

Figure 11:
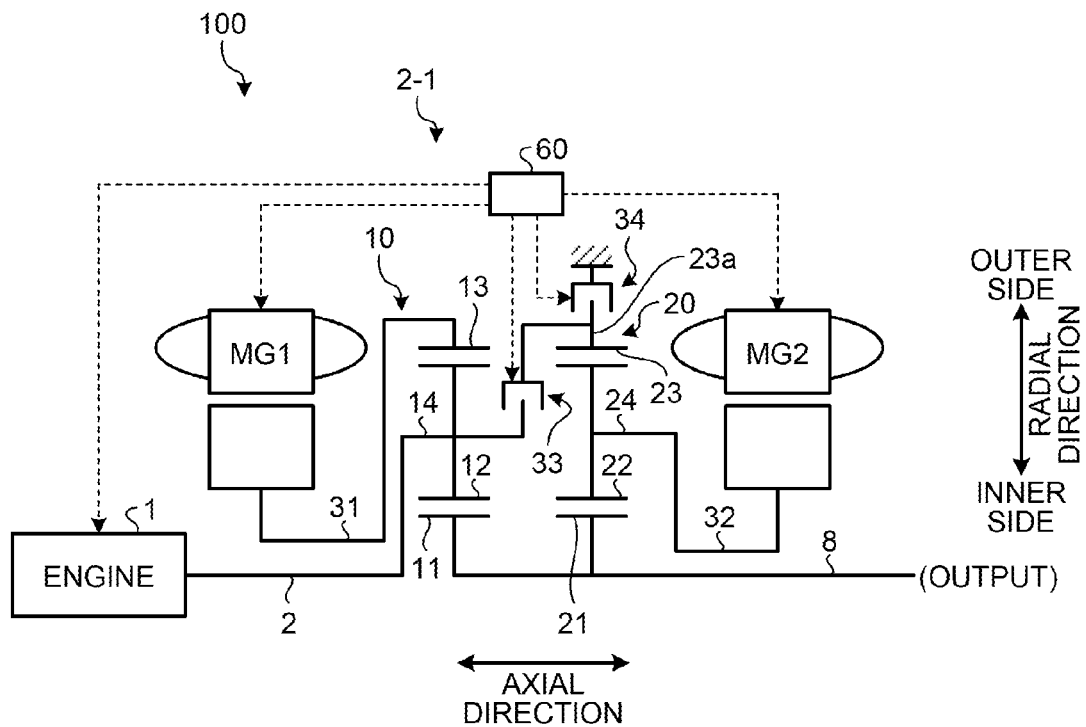
FIG. 11 is a skeleton diagram of a vehicle according to a second embodiment.
Figure 12:
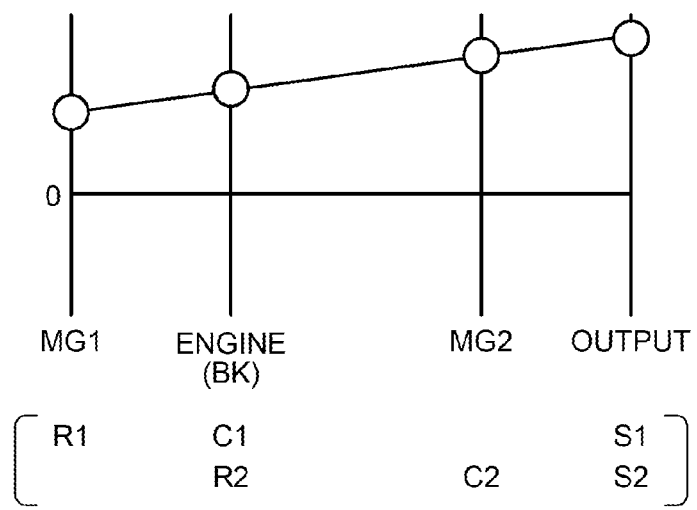
FIG. 12 is an alignment chart in a four-element mode of a driving device for hybrid vehicle according to the second embodiment.

A second embodiment is described with reference to FIGS. 11 to 15. In the second embodiment, the same reference sign is assigned to a component having a function similar to that described in the above-described embodiment and the description is not repeated. FIG. 11 is a skeleton diagram of a vehicle according to the second embodiment and FIG. 12 is an alignment chart in a four-element mode of a driving device for hybrid vehicle according to this embodiment.

A driving device for hybrid vehicle 2-1 of this embodiment is different from the driving devices for hybrid vehicle 1-1, 1-2, 1-3, and 1-4 of the above-described first embodiment and variations in arrangement order of rotational elements in an alignment chart in a four-element mode. As illustrated in FIG. 12, the rotational elements in the alignment chart in the four-element mode are arranged in following order: a rotational element connected to a first rotating electrical machine MG1, a rotational element connected to an engine 1, a rotational element connected to a second rotating electrical machine MG2, and output rotational elements. According to this, it is possible to form a mechanical point on a high-gear side than the equal speed ratio as described later.

As illustrated in FIG. 11, in the driving device for hybrid vehicle 2-1 according to this embodiment, a first carrier 14 is connected to a rotary shaft 2 of the engine 1. That is to say, the first carrier 14 corresponds to the rotational element connected to the engine 1. A first ring gear 13 is connected to a rotary shaft 31 of the first rotating electrical machine MG1. That is to say, the first ring gear 13 corresponds to the rotational element connected to the first rotating electrical machine MG1. A second carrier 24 is connected to a rotary shaft 32 of the second rotating electrical machine MG2. That is to say, the second carrier 24 corresponds to the rotational element connected to the second rotating electrical machine MG2. A first sun gear 11 and a second sun gear 21 are connected to an output shaft 8. The output shaft 8 is arranged coaxially with the rotary shaft 2 of the engine 1 on an extended line of the rotary shaft 2. The driving device for hybrid vehicle 2-1 according to this embodiment may form the output shaft on a central axis, so that this may be easily applied to a FR structure in which a uniaxial configuration is required. That is to say, the driving device for hybrid vehicle 2-1 may be applied to a FF vehicle and a FR vehicle.

The first rotating electrical machine MG1, a first planetary gear mechanism 10, a clutch 33, a second planetary gear mechanism 20 and a brake 34, and the second rotating electrical machine MG2 are arranged coaxially with the rotary shaft 2 of the engine 1 in this order from a side of the engine 1.

The output shaft 8 is connected to a drive wheel of a vehicle 100 through a deceleration mechanism and the like. That is to say, the first sun gear 11 and the second sun gear 21 are gears arranged on the output shaft of the first planetary gear mechanism 10 and second planetary gear mechanism 20 and correspond to the output rotational elements to output power of the engine 1, the first rotating electrical machine MG1, and the second rotating electrical machine MG2 to the drive wheel.

The second ring gear 23 is connected to the first carrier 14 and the engine 1 through the clutch 33. The clutch 33 may be similar to the clutch 3 of the above-described first embodiment. The brake 34 regulates rotation of the second ring gear 23. The brake 34 may be similar to the brake 4 of the above-described first embodiment. The brake 34 is arranged on an outer side in a radial direction of the second ring gear 23. An engaging unit 23a is provided on an outer periphery of the second ring gear 23. The brake 34 regulates the rotation of the second ring gear 23 by engaging with the engaging unit 23a.

An ECU 60 has a function to control the engine 1, the first rotating electrical machine MG1, the second rotating electrical machine MG2, the clutch 33, and the brake 34 as the ECU 50 of the above-described first embodiment.

An engagement table of the driving device for hybrid vehicle 2-1 of this embodiment is similar to the engagement table of the driving device for hybrid vehicle 1-1 of the above-described first embodiment. Therefore, the driving device for hybrid vehicle 2-1 may execute an EV-1 mode, an EV-2 mode, an HV-1 mode, and an HV-2 mode.

Figure 13:
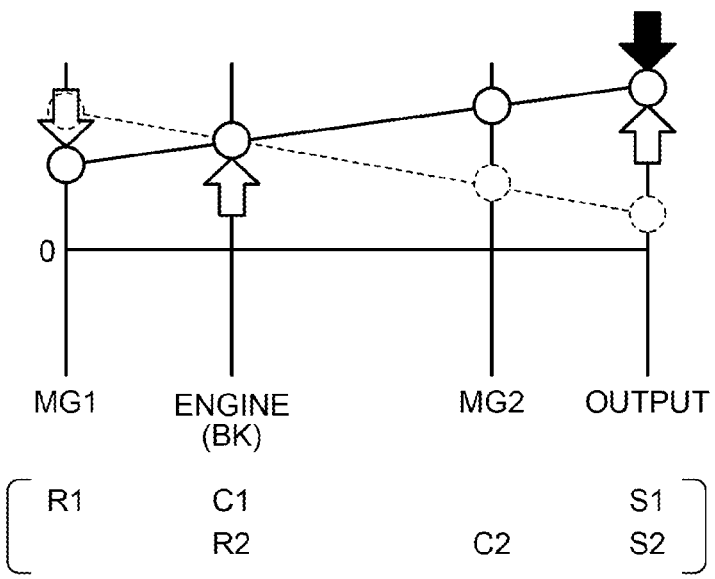
FIG. 13 is an alignment chart at the time of forward movement in a HV-2 mode of the second embodiment.
Figure 14:
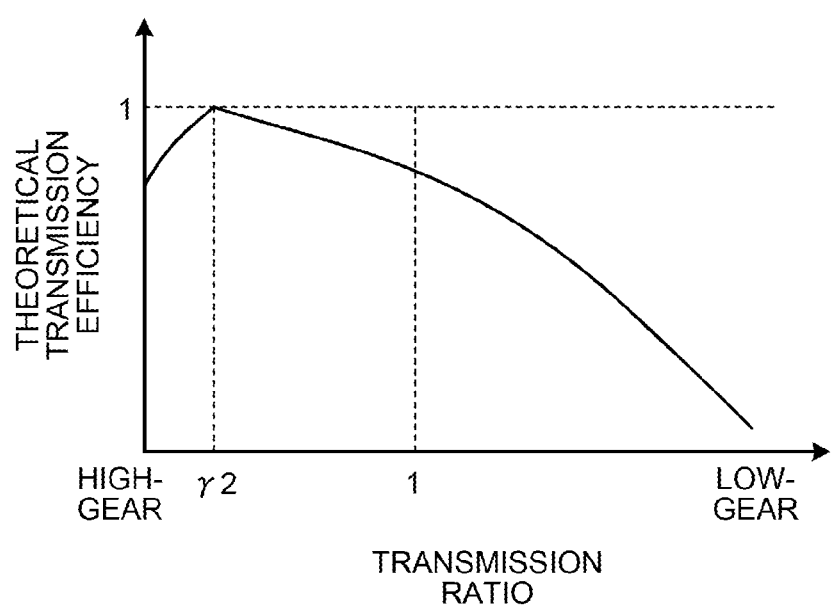
FIG. 14 is a view of theoretical transmission efficiency of the driving device for hybrid vehicle according to the second embodiment.
Figure 15:
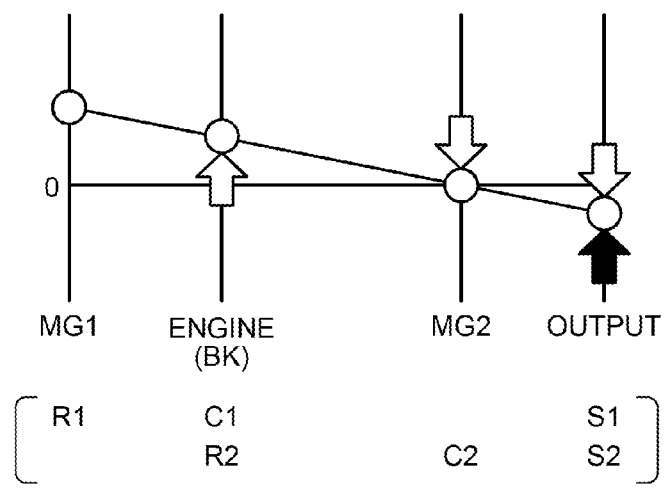
FIG. 15 is an alignment chart at the time of reverse driving in the HV-2 mode of the second embodiment.

FIG. 13 is an alignment chart at the time of forward movement in the HV-2 mode of the second embodiment, FIG. 14 is a view of theoretical transmission efficiency of the driving device for hybrid vehicle 2-1 according to the second embodiment, and FIG. 15 is an alignment chart at the time of reverse driving in the HV-2 mode of the second embodiment.

As illustrated in FIG. 13, the ECU 60 allows the first rotating electrical machine MG1 to function as a reaction force receiver for the engine 1 at the time of the forward movement in the HV-2 mode. The first rotating electrical machine MG1 may rotate in the positive rotation direction and generate negative torque, thereby receiving reaction force of the engine 1 to output power from the output rotational element to the output shaft 8. In FIG. 13, a solid line is an example of the alignment chart in cruise mode at the time of constant driving, low-load driving and the like. In FIG. 13, a broken line is an example of the alignment chart at the time of acceleration, high-load driving and the like.

As illustrated in FIG. 14, the theoretical transmission efficiency of the driving device for hybrid vehicle 2-1 reaches maximum efficiency at a transmission ratio γ2. The transmission ratio γ2 is the transmission ratio at which a rotational speed of the first rotating electrical machine MG1 (first ring gear 13) is set to 0. The transmission ratio γ2 is the transmission ratio on an overdrive side, that is to say, the transmission ratio smaller than the equal speed ratio. That is to say, in the driving device for hybrid vehicle 2-1, the mechanical point when the first rotating electrical machine MG1 receives the reaction force in the four-element mode may be formed on the high-gear side and it is possible to form a hybrid system excellent in efficiency at a high speed.

As illustrated in FIG. 15, the ECU 60 allows the second rotating electrical machine MG2 to function as the reaction force receiver for the engine 1 at the time of the reverse driving in the HV-2 mode. The second rotating electrical machine MG2 outputs reaction torque for engine torque and outputs the power to the output shaft 8. At that time, the second rotating electrical machine MG2 outputs negative torque. The second rotating electrical machine MG2 may generate the reaction torque by power generation when it is controlled such that the second rotating electrical machine MG2 rotates in the positive rotation direction in the reverse driving.

At the time of the reverse driving, the first rotating electrical machine MG1 may generate assist torque, generate electric power, and may run idle without power running and power generation. The ECU 60 may determine operation of the first rotating electrical machine MG1 at the time of the reverse driving based on a state of charge SOC of a battery, for example. The driving device for hybrid vehicle 2-1 may convert positive rotation positive torque of the engine 1 to negative rotation negative torque to output from the output rotational element by making the second rotating electrical machine MG2 the reaction force receiver as in the case of the driving device for hybrid vehicle 1-1 of the above-described first embodiment. Therefore, driving force at the time of the reverse driving may be enlarged.

Another mechanical point in the EV-2 mode is an operation point on which a rotational speed of the second rotating electrical machine MG2 is set to 0 at the time of the reverse driving in the HV-2 mode as in the case of the above-described first embodiment. That is to say, another mechanical point occurs on a reverse side, in other words, in a region of a negative transmission ratio.

[First Variation of Second Embodiment]

Figure 16:
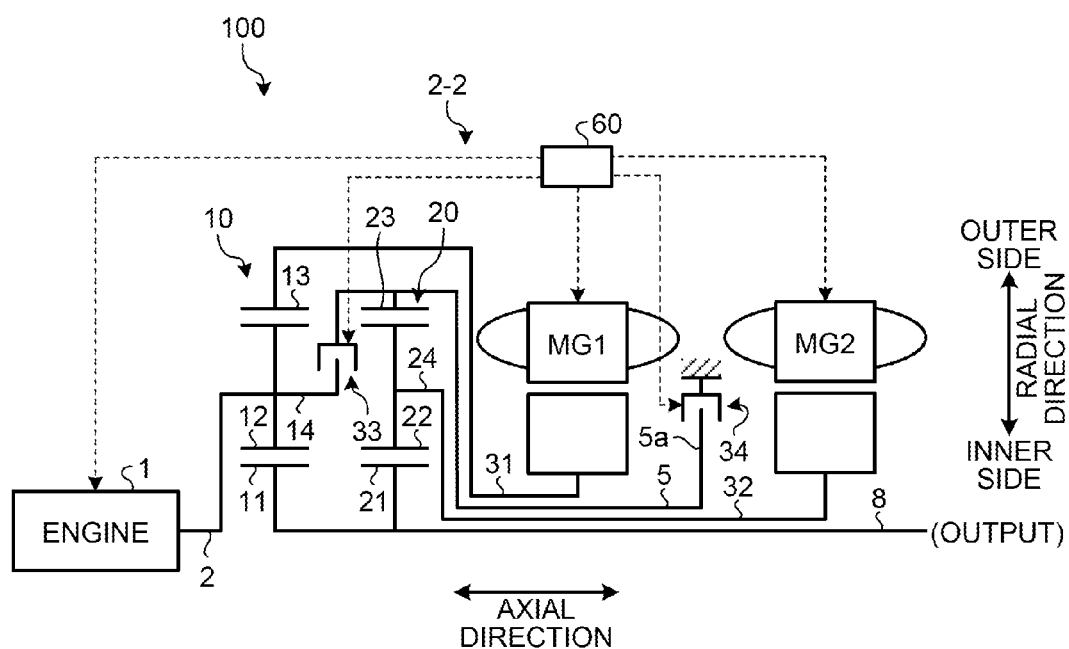
FIG. 16 is a skeleton diagram of a vehicle according to a first variation of the second embodiment.

A first variation of the second embodiment is described. FIG. 16 is a skeleton diagram of a vehicle according to the first variation of the second embodiment. A driving device for hybrid vehicle 2-2 of this variation is different from the driving device for hybrid vehicle 2-1 of the above-described second embodiment in an arrangement of each component in an axial direction.

As illustrated in FIG. 16, a first planetary gear mechanism 10, a clutch 33, a second planetary gear mechanism 20, a first rotating electrical machine MG1, a brake 34, and a second rotating electrical machine MG2 are arranged coaxially with a rotary shaft 2 of an engine 1 in this order from a side of the engine 1. Connection relationship among the engine 1, the first rotating electrical machine, and the second rotating electrical machine MG2, and the planetary gear mechanisms 10 and 20 is the same as that of the above-described second embodiment.

[Second Variation of Second Embodiment]

Figure 17:
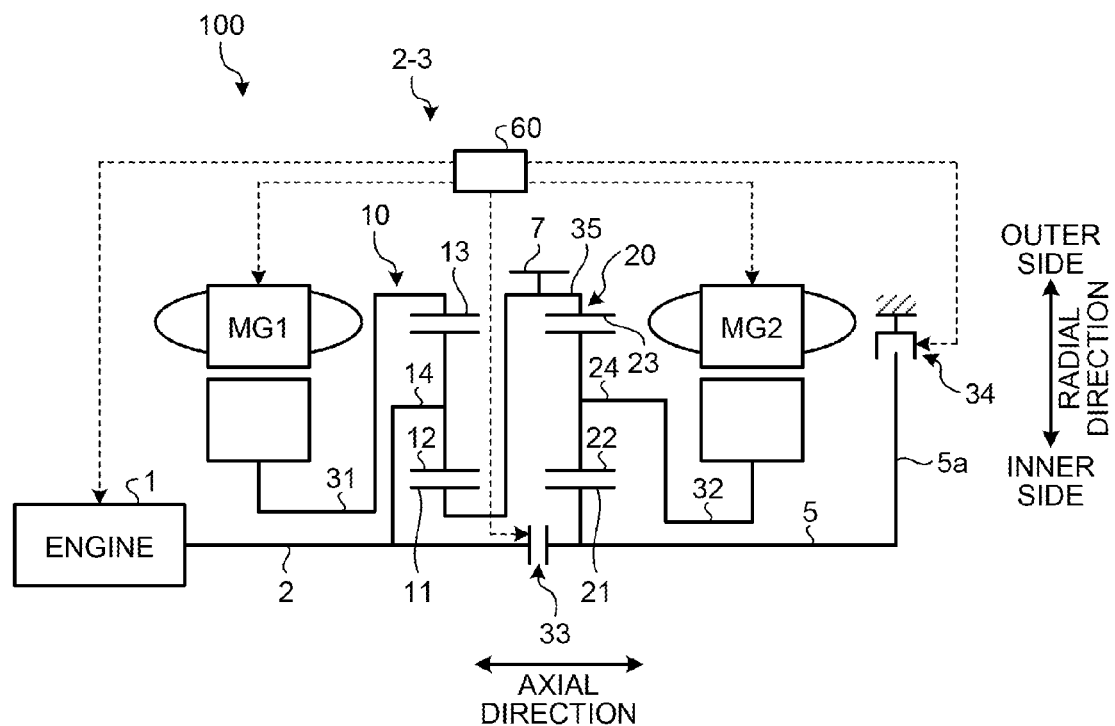
FIG. 17 is a skeleton diagram of a vehicle according to a second variation of the second embodiment.

A second variation of the second embodiment is described. FIG. 17 is a skeleton diagram of a vehicle according to the second variation of the second embodiment. A driving device for hybrid vehicle 2-3 according to this variation is different from the driving device for hybrid vehicle 2-1 of the above-described second embodiment in that a rotational element connected to a brake 34 and an output rotational element are changed in a second planetary gear mechanism 20.

As illustrated in FIG. 17, in the second planetary gear mechanism 20, the output rotational element is a second ring gear 23 and the rotational element connected to the brake 34 is a second sun gear 21. The second ring gear 23 is connected to a first sun gear 11 through a connecting member 35. The connecting member 35 is arranged on an outer side in a radial direction of the second planetary gear mechanism 20. An output gear 7 is arranged on an outer periphery of the connecting member 35.

The second sun gear 21 is connected to a first carrier 14 and an engine 1 through a rotary shaft 5 and a clutch 33. The brake 34 regulates rotation of the second sun gear 21. Specifically, the brake 34 regulates the rotation of the second sun gear 21 by engaging with an engaging unit 5a of the rotary shaft 5.

As in the case of the driving device for hybrid vehicle 2-1 of the above-described second embodiment, a rotational element connected to the engine 1 is the first carrier 14, a rotational element connected to a first rotating electrical machine MG1 is a first ring gear 13, and a rotational element connected to a second rotating electrical machine MG2 is a second carrier 24. Different from the driving device for hybrid vehicle 2-1 of the above-described second embodiment, the output rotational elements are the first sun gear 11 and the second ring gear 23, and the brake 34 regulates the rotation of the second sun gear 21.

Figure 18:
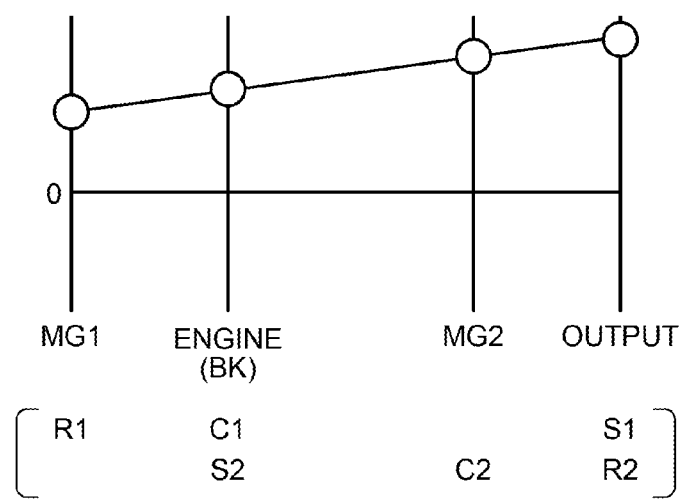
FIG. 18 is an alignment chart in a four-element mode of a driving device for hybrid vehicle according to the second variation of the second embodiment.

FIG. 18 is an alignment chart in a four-element mode of the driving device for hybrid vehicle 2-3 according to the second variation of the second embodiment. As in the case of the driving device for hybrid vehicle 2-1 of the above-described second embodiment, the rotational elements in the alignment chart in the four-element mode are arranged in following order: the rotational element connected to the first rotating electrical machine MG1, the rotational element connected to the engine 1, the rotational element connected to the second rotating electrical machine MG2, and the output rotational elements. Therefore, the driving device for hybrid vehicle 2-3 according to this variation may obtain an effect similar to that of the driving device for hybrid vehicle 2-1 of the above-described second embodiment and the driving device for hybrid vehicle 2-2 of the above-described first variation of the second embodiment.

[Third Variation of Second Embodiment]

Figure 19:
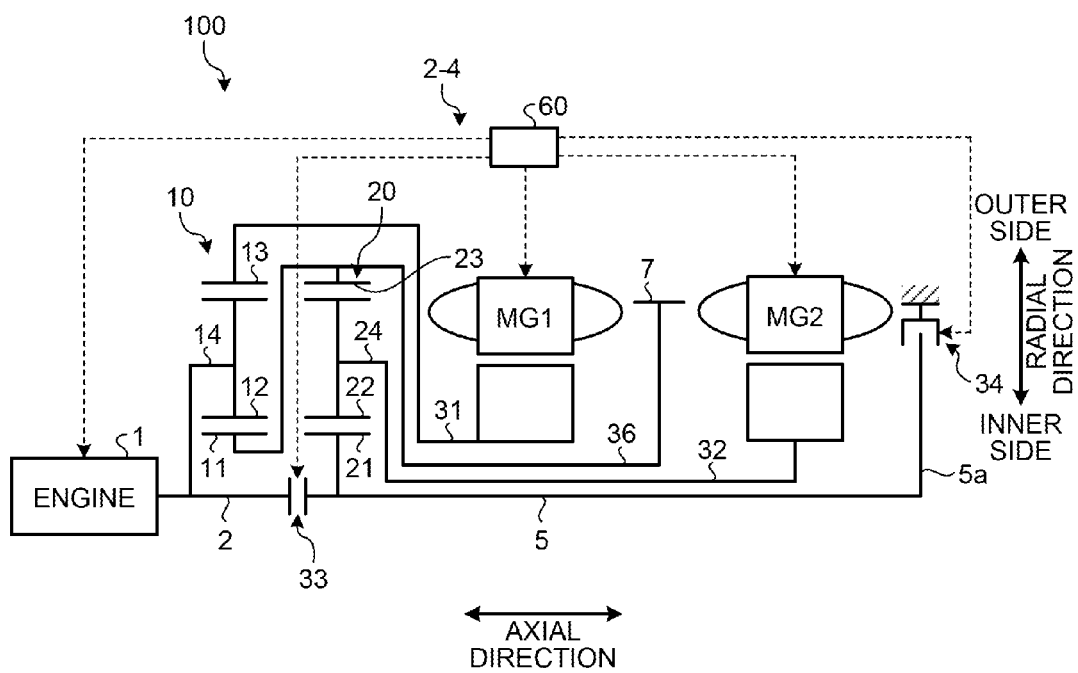
FIG. 19 is a skeleton diagram of a vehicle according to a third variation of the second embodiment.

A third variation of the second embodiment is described. FIG. 19 is a skeleton diagram of a vehicle according to the third variation of the second embodiment. A driving device for hybrid vehicle 2-4 according to this variation is different from the driving device for hybrid vehicle 2-3 of the above-described second variation of the second embodiment in an arrangement in an axial direction of each component.

A first planetary gear mechanism 10, a clutch 33, a second planetary gear mechanism 20, a first rotating electrical machine MG1, an output gear 7, a second rotating electrical machine MG2, and a brake 34 are arranged coaxially with a rotary shaft 2 of an engine 1 in this order from a side closer to the engine 1.

The output gear 7 is connected to a second ring gear 23 through a connecting member 36. The connecting member 36 having a cylindrical shape is arranged coaxially with a rotary shaft 5 on an outer side in a radial direction of a rotary shaft 32 of the second rotating electrical machine MG2. A rotary shaft 31 of the first rotating electrical machine MG1 is arranged on an outer side in a radial direction of the connecting member 36.

[Another Variation]

Another variation of the above-described embodiments is described. A one-way clutch may be arranged so as to be parallel to the brakes 4 and 34 in the driving devices for hybrid vehicle 1-1, 1-2, 1-3, 1-4, 2-1, 2-2, 2-3, and 2-4 of the above-described embodiments and variations.

For example, in a case of the driving device for hybrid vehicle 1-1 of the above-described first embodiment illustrated in FIG. 1, the one-way clutch may be provided for the engaging unit 5a. The one-way clutch allows rotation in the positive rotational direction of the engaging unit 5a and regulates negative rotation thereof. According to this, it becomes possible to start without engaging the brake 4 when starting in the EV-1 mode. The one-way clutch engages to serve as the reaction force receiver for the MG2 torque, so that it is possible to start the vehicle 100 by transmitting the power from the second sun gear 21 to the output gear 7.

Since it becomes not necessary to engage the brake 4 when starting in the EV-1 mode, an electrical oil pump in a stopping state and the like is not required, so that control becomes simple and energy necessary for driving the electrical oil pump may be decreased.

The planetary gear mechanisms 10 and 20 of the above-described embodiments and variations are the single-pinion type, so that a meshing frequency of the gears decreases and this might be advantageous in terms of loss. However, the planetary gear mechanisms 10 and 20 are not limited to the single-pinion type and may be appropriately a double-pinion type.

Although the rotational element connected to the second rotating electrical machine MG2 is located between the rotational element connected to the engine 1 and the output rotational elements in the alignment chart in the four-element mode in the above-described embodiments and variations, the rotational element connected to the first rotating electrical machine MG1 may be located in place of this.

Although a switching device for switching a mode of the differential mechanism is the clutch 3 and the brake 4 in the above-described embodiments and variations, the device is not limited to them. Another device may also be used as the switching device.

Contents disclosed in the above-described embodiments and variations may be appropriately combined to be executed.

REFERENCE SIGNS LIST 1-1, 1-2, 1-3, 1-4, 2-1, 2-2, 2-3, 2-4 Driving device for hybrid vehicle
1 Engine (engine)
3, 33 Clutch
4, 34 Brake
10 First planetary gear mechanism
11 First sun gear (S1)
13 First ring gear (R1)
14 First carrier (C1)
20 Second planetary gear mechanism
21 Second sun gear (S2)
23 Second ring gear (R2)
24 Second carrier (C2)
50, 60 ECU
100 Vehicle
MG1 First rotating electrical machine
MG2 Second rotating electrical machine

The invention claimed is:
1. A driving device for a hybrid vehicle, comprising:
an engine;
a first rotating electrical machine;
a second rotating electrical machine;
a first planetary gear mechanism as a first differential mechanism;
a second planetary gear mechanism as a second differential mechanism;
a clutch as a switching device; and
a brake, wherein
the first differential mechanism and the second differential mechanism are connected to each other through output rotational elements,
the engine, the first rotating electrical machine, and the second rotating electrical machine are connected respectively to different rotational elements out of rotational elements of the first differential mechanism and the second differential mechanism,
the switching device switches between an independent mode in which the first differential mechanism and the second differential mechanism differentially rotate independently of each other and a four-element mode in which one rotational element of the first differential mechanism and one rotational element of the second differential mechanism are connected to each other,
in the four-element mode, a rotational element connected to the engine, a rotational element connected to the first rotating electrical machine, a rotational element connected to the second rotating electrical machine, and the output rotational elements differentially rotate,
the rotational element connected to the engine is a sun gear of the first planetary gear mechanism,
the rotational element connected to the first rotating electrical machine is a ring gear of the first planetary gear mechanism, the rotational element connected to the second rotating electrical machine is a carrier of the second planetary gear mechanism, the output rotational elements are a carrier of the first planetary gear mechanism and a sun gear of the second planetary gear mechanism, a ring gear of the second planetary gear mechanism is connected to the sun gear of the first planetary gear mechanism and the engine through the clutch, and the brake regulates rotation of the ring gear of the second planetary gear mechanism.

2. A driving device for a hybrid vehicle, comprising:
an engine
a first rotating electrical machine;
a second rotating electrical machine;
a first planetary gear mechanism as a first differential mechanism;
a second planetary gear mechanism as a second differential mechanism;
a clutch as a switching device; and
a brake, wherein the first differential mechanism and the second differential mechanism are connected to each other through output rotational elements, the engine, the first rotating electrical machine, and the second rotating electrical machine are connected respectively to different rotational elements out of rotational elements of the first differential mechanism and the second differential mechanism, the switching device switches between an independent mode in which the first differential mechanism and the second differential mechanism differentially rotate independently of each other and a four-element mode in which one rotational element of the first differential mechanism and one rotational element of the second differential mechanism are connected to each other, in the four-element mode a rotational element connected to the engine, a rotational element connected to the first rotating electrical machine, a rotational element connected to the second rotating electrical machine, and the output rotational elements differentially rotate, the rotational element connected to the engine is a sun gear of the first planetary gear mechanism, the rotational element connected to the first rotating electrical machine is a ring gear of the first planetary gear mechanism, the rotational element connected to the second rotating electrical machine is a carrier of the second planetary gear mechanism, the output rotational elements are a carrier of the first planetary gear mechanism and a ring gear of the second planetary gear mechanism, a sun gear of the second planetary gear mechanism is connected to the sun gear of the first planetary gear mechanism and the engine through the clutch, and the brake regulates rotation of the sun gear of the second planetary gear mechanism.

3. A driving device for a hybrid vehicle, comprising:
an engine;
a first rotating electrical machine;
a second rotating electrical machine;
a first planetary gear mechanism as a first differential mechanism;
a second planetary gear mechanism as a second differential mechanism;
a clutch as a switching device; and
a brake, wherein the first differential mechanism and the second differential mechanism are connected to each other through output rotational elements, the engine, the first rotating electrical machine, and the second rotating electrical machine are connected respectively to different rotational elements out of rotational elements of the first differential mechanism and the second differential mechanism, the switching device switches between an independent mode in which the first differential mechanism and the second differential mechanism differentially rotate independently of each other and a four-element mode in which one rotational element of the first differential mechanism and one rotational element of the second differential mechanism are connected to each other, in the four-element mode, a rotational element connected to the engine, a rotational element connected to the first rotating electrical machine, a rotational element connected to the second rotating electrical machine, and the output rotational elements differentially rotate, the rotational element connected to the engine is a carrier of the first planetary gear mechanism, the rotational element connected to the first rotating electrical machine is a ring gear of the first planetary gear mechanism, the rotational element connected to the second rotating electrical machine is a carrier of the second planetary gear mechanism, the output rotational elements are a sun gear of the first planetary gear mechanism and a sun gear of the second planetary gear mechanism, a ring gear of the second planetary gear mechanism is connected to the carrier of the first planetary gear mechanism and the engine through the clutch, and the brake regulates rotation of the ring gear of the second planetary gear mechanism.

4. A driving device for a hybrid vehicle, comprising:
an engine;
a first rotating electrical machine;
a second rotating electrical machine;
a first planetary gear mechanism as a first differential mechanism;
a second planetary gear mechanism as a second differential mechanism;
a clutch as a switching device; and
a brake, wherein the first differential mechanism and the second differential mechanism are connected to each other through output rotational elements, the engine, the first rotating electrical machine, and the second rotating electrical machine are connected respectively to different rotational elements out of rotational elements of the first differential mechanism and the second differential mechanism, the switching device switches between an independent mode in which the first differential mechanism and the second differential mechanism differentially rotate independently of each other and a four-element mode in which one rotational element of the first differential mechanism and one rotational element of the second differential mechanism are connected to each other, in the four-element mode, a rotational element connected to the engine, a rotational element connected to the first rotating electrical machine a rotational element connected to the second rotating electrical machine, and the output rotational elements differentially rotate, the rotational element connected to the engine is a carrier of the first planetary gear mechanism, the rotational element connected to the first rotating electrical machine is a ring gear of the first planetary gear mechanism, the rotational element connected to the second rotating electrical machine is a carrier of the second planetary gear mechanism, the output rotational elements are a sun gear of the first planetary gear mechanism and a ring gear of the second planetary gear mechanism, a sun gear of the second planetary gear mechanism is connected to the carrier of the first planetary gear mechanism and the engine through the clutch, and the brake regulates rotation of the sun gear of the second planetary gear mechanism.

\* \* \* \* \*